Nov. 9, 1948.    L. E. NORTON    2,453,533
ELECTROSTATIC MICROWAVE ENERGY MEASURING APPARATUS
Filed June 11, 1945    2 Sheets-Sheet 2
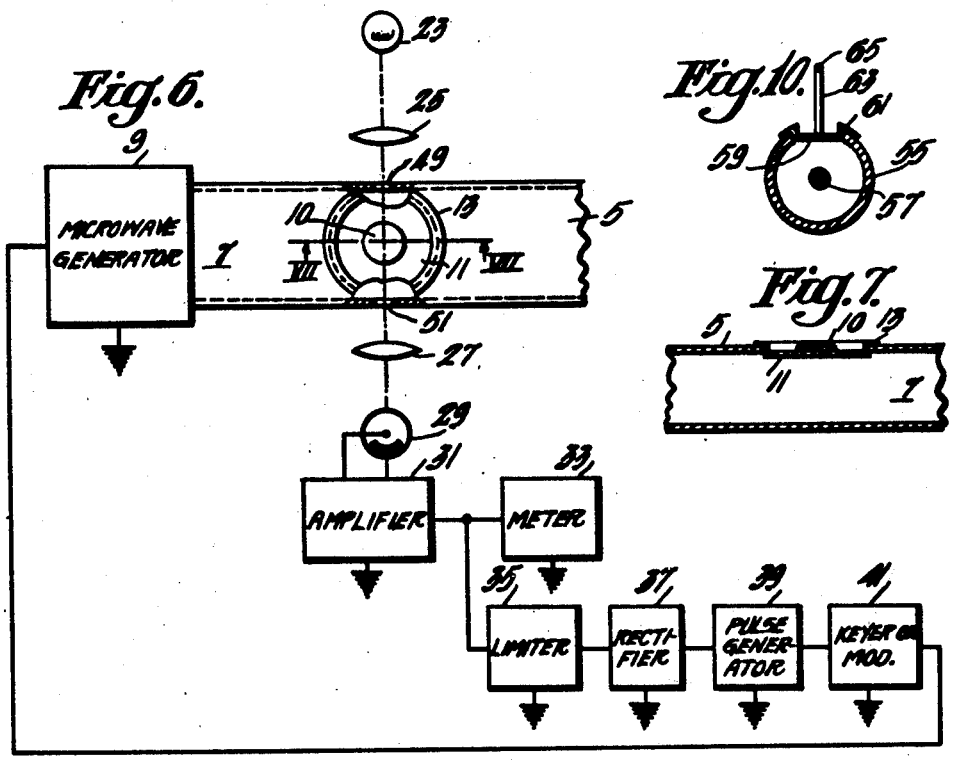
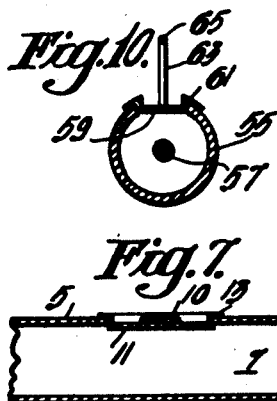
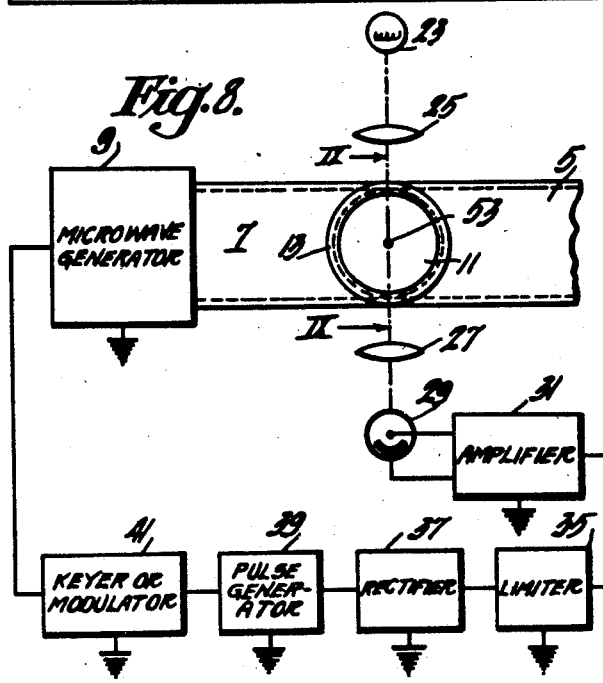
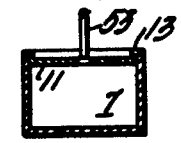
INVENTOR.
Lowell E. Norton
BY
ATTORNEY Patented Nov. 9, 1948

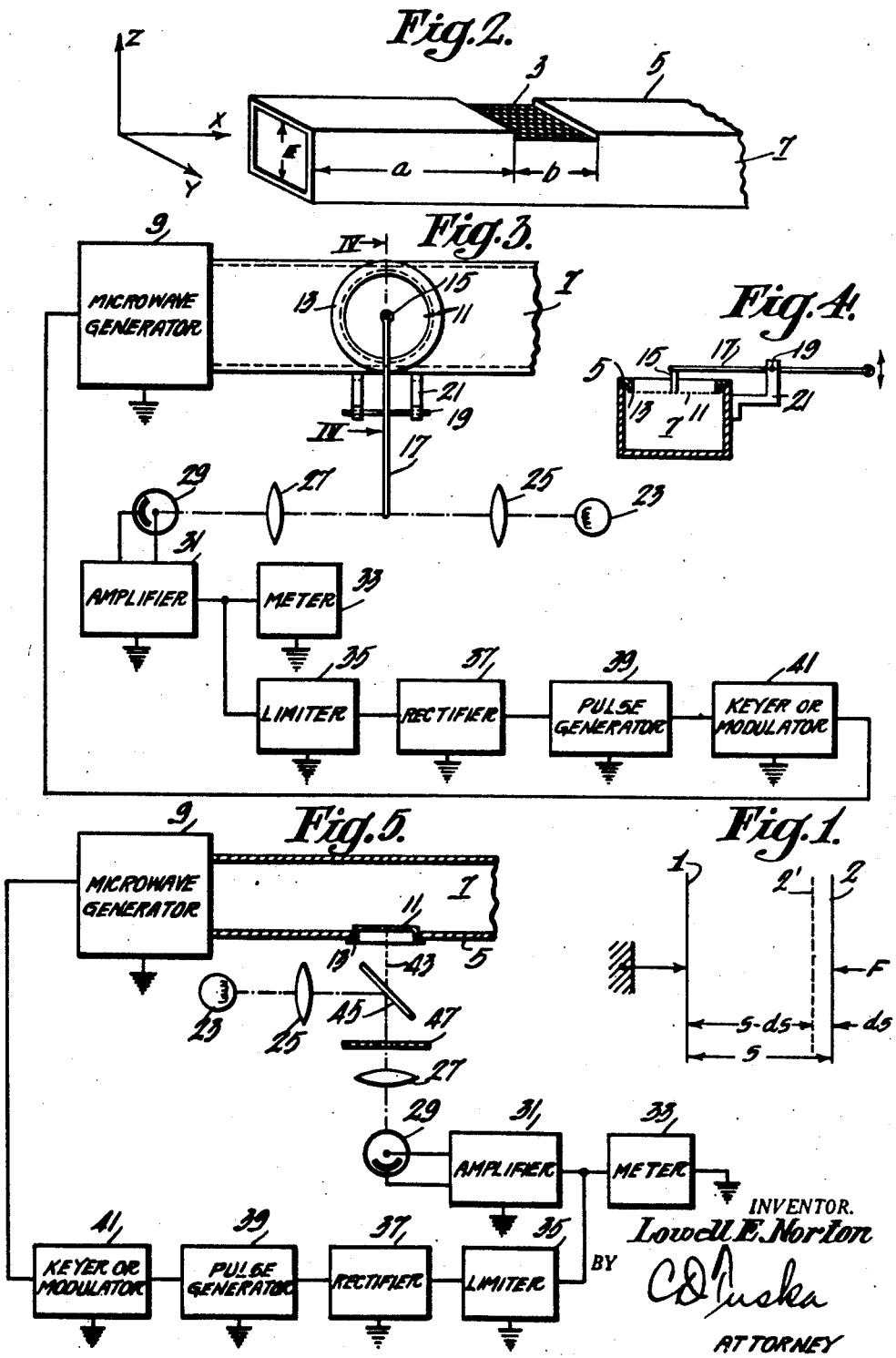

2,453,533

UNITED STATES PATENT OFFICE 2,453,533

ELECTROSTATIC MICROWAVE ENERGY MEASURING APPARATUS

Lowell E. Norton, Princeton Junction, N. J., assignor to Radio Corporation of America, a corporation of Delaware Application June 11, 1945, Serial No. 598,741

9 Claims. (Cl. 171—95)

This invention relates generally to improved methods of and means for measuring microwave transmission and more particularly to systems and methods for measuring microwave transmission through waveguides or coaxial transmission lines by employing the displacement of a portion of the outer wall of the transmission system due to stresses induced therein by the electric fields within the system to control a light beam which is focused upon a light-sensitive translating device for generating electric potentials or currents characteristic of the transmitted microwave energy.

Typical systems and methods will be described hereinafter by reference to their application to waveguide transmission systems. However, the same principles may be applied to coaxial transmission systems. If a portion of one of the wide faces of a waveguide is removed, and a flexible conductive diaphragm is substituted therefor, the stresses induced in the diaphragm in response to the electric fields due to microwave propagation through the waveguide will provide mechanical displacement of the diaphragm as a function of the strength of the electric fields. An increase in the electric field strength will tend to displace the diaphragm closer to the opposite waveguide wall while a lesser field strength will exert correspondingly less force upon the flexible diaphragm. If the diaphragm is highly resilient, and a good electrical conductor, its inherently high Q will provide measurable mechanical displacement with negligible absorption of microwave energy. The effect upon the diaphragm of the corresponding magnetic fields within the waveguide upon the diaphragm displacement will tend to reduce said displacement to a slight extent, but the resultant of the displacements due to the electric and the magnetic fields may be usefully employed for measurements of the microwave energy propagated through the guide.

The instant invention is an improvement upon the systems and methods disclosed and claimed in applicant's copending U. S. application, Serial No. 598,739, filed June 11, 1945, wherein the mechanical displacement of the flexible conductive diaphragm may be employed to generate electric potentials as a function of the pressure applied by the diaphragm to a piezo crystal, or alternately, the diaphragm may comprise one electrode of a variable capacitor whereon the capacitance or the variations in electrical charge upon the capacitor may be employed to actuate an indicator or a control circuit. In the instant invention the diaphragm displacement controls or shutters a light beam which is focused upon a light-sensitive translating device for generating currents or voltages characteristic of the microwave modulation.

Among the objects of the invention are to provide improved methods of and means for measuring microwave energy. Another object of the invention is to provide improved methods of and means for measuring microwave power propagated through a waveguide system. A further object of the invention is to provide improved methods of and means for measuring microwave energy propagated through a coaxial transmission system. An additional object of the invention is to provide improved methods of and means for measuring microwave propagation through a wave transmission system by employing the mechanical displacement of a flexible conductive element forming a portion of said system and responsive to the microwave fields therein. Another object is to provide improved methods of and means for measuring microwave energy propagated through a waveguide wherein the mechanical displacement of a portion of the waveguide wall controls a light beam focused upon a light-sensitive translating device for generating electric potentials characteristic of the microwave transmission.

An additional object is to provide improved methods of and means for measuring microwave transmission through a waveguide wherein a flexible conductive element forming a portion of the waveguide walls is coupled through a lever mechanism to control a light beam focused upon a photoelectric device for deriving a varying current or voltage characteristic of the microwave energy propagated through said guide. Another object is to provide a device of the type described wherein the diaphragm controls the position of a mirror for controlling the light beam. A still further object of the invention is to provide an improved method of and means for detecting microwave energy propagated through a waveguide including means for modulating said microwave energy as a function of the displacement forces detected by a mechanical element responsive to the microwave field. An additional object is to provide improved methods of and means for measuring microwave transmission through a waveguide or coaxial transmission system including a novel light responsive indicator and microwave modulation control circuit which are responsive to the resultant of the forces induced by the electric and the magnetic fields in the transmission system upon a flexible conductive diaphragm subjected to said fields and controlling a light translating system.

The invention will be described in greater detail by reference to the accompanying drawings of which Figure 1 is a schematic diagram illustrating the mechanical displacement of a flexible conductive element subjected to varying electric fields, Figure 2 is a perspective view of a typical waveguide including a flexible conductive diaphragm inserted in one of the wide faces thereof, Figure 3 is a plan view including a block schematic circuit diagram of a first embodiment of the invention, Figure 4 is a cross-sectional elevational view taken along the line IV—IV of said first embodiment of the invention, Figure 5 is a longitudinal cross-sectional view of a second embodiment of the invention, Figures 6 and 7 are plan and elevational views along the line VII—VII, respectively, of a first modification of the first embodiment of the invention, Figures 8 and 9 are plan and cross-sectional elevational views along the line IX—IX, respectively, of a second modification of said first embodiment of the invention, and Figure 10 is a transversely cross-sectional elevational view of a third or coaxial line embodiment of the invention. Similar reference characters are applied to similar elements throughout the drawings.

Referring to Figure 1, one of the wide faces 1 of a waveguide is normally spaced a distance $s$ from the opposite wide face 2 thereof which includes a flexible conductive diaphragm of the type described herein. If modulated microwaves are propagated between the waveguide conductors 1 and 2, the forces acting on the flexible diaphragm forming a portion of the waveguide conductor 2 will be proportional to the resultant of the stresses induced therein by the microwave electric and magnetic fields. At microwave frequencies the electrodes 1 and 2 will have both intensity and phase distribution with position and time, but since the two electrodes are charged surfaces having opposite polarity for corresponding incremental areas, the forces between said incremental areas are always attracting and are additive throughout the total areas of the flexible diaphragm as well as throughout other corresponding areas of the opposite waveguide faces. In electrostatic c. g. s. units the energy stored in an air dielectric is $$W = \tfrac{1}{2} CV^2 \text{ ergs} \tag{1}$$

wherein C is the capacitance and V is the voltage between the conductors of the capacitor.

If the electrode 2 is displaced a distance $dS$ from its initial spacing S and is maintained in equilibrium by a holding force F, the resultant stored energy is $$W_1 = \tfrac{1}{2} \frac{S}{S+dS} C \left(\frac{S+dS}{S} V\right)^2 \text{ ergs} \tag{2}$$

The increase in energy is $dW$, which is equal to $W_1 - W$, and must equal $FdS$ so that $$FdS = W_1 - W = \tfrac{1}{2}\frac{S}{S+dS}C\left(\frac{S+dS}{S}V\right)^2 - \tfrac{1}{2}CV^2 =$$

$$\tfrac{1}{2}\frac{dS}{S}CV^2 \text{ ergs} \tag{3}$$

or $$F = \frac{CV^2}{2S} \text{ dynes} \tag{4}$$

Since one statvolt = 300 volts and one statfarad = $\tfrac{1}{9} \times 10^{-11}$ farads, if C and V are expressed in farads and volts respectively then $$F = \frac{CV^2}{2S} \times 10^7 \text{ dynes} \tag{5}$$

A typical application of the invention to a rectangular waveguide system, illustrated in Figure 2, includes a flexible conductive diaphragm 3 set into the upper waveguide face 5 of a typical waveguide system 7. For the sake of illustration, the conductive diaphragm 3 extends the full width of the waveguide face, and also extends a distance $b$ along said waveguide face in the direction of wave propagation. For purposes of computation, it may be assumed that the guided microwave propagation along the waveguide is in the X and −X directions and that the electric vector is in the ZY plane. For most types of operation it is desirable that the conductive diaphragm 3 have high mechanical Q and relatively high deflection sensitivity at the microwave modulation or interruption rate. The microwave modulation or interruption may be accomplished by modulating the microwave source directly or by interrupting the microwave transmission by means of a suitable shutter or other device disposed between the microwave source and the flexible diaphragm.

Employing the XYZ coordinate system of Figure 2, the electric intensity is represented by $E = E_0 f(X, Y, Z, t)$, where $t$ is the time in seconds.

In conventional guided microwave propagation utilizing high conductivity waveguide wall conductors parallel to the XY plane, and disregarding the dependence of the voltage E upon the Y axis, $$E = E_0 \sin(\omega t + kx) \tag{6}$$

The electric force acting on the parallel upper and lower waveguide walls on a unit area of said walls is $$F = KE^2 \tag{7}$$

so that $$\Delta F = KE_0^2 \, \Delta A \, \sin^2(\omega t + kx) \tag{8}$$

where $\Delta F$ is the force acting on an incremental wall area $\Delta A$ (which is small with respect to the wavelength scale). For a waveguide wall of unity width along the Y axis and extending from $X = a$ to $X = a+b$ along the X axis, the electric force acting on the opposite waveguide walls per unit width and per unit length for any length $b$ per cycle of the propagated radiation is $$F_1 = K \int_0^{\frac{2\pi}{\omega}} \int_a^{a+b} \frac{E_0^2 \sin^2(\omega t + kx)}{\frac{2\pi}{\omega}(a+b-a)} \, dx\,dt =$$

$$K\frac{\omega E_0^2}{2\pi b} \int_0^{\frac{2\pi}{\omega}} \int_a^{a+b} \left[\frac{1}{2} - \frac{\cos(2\omega t + 2kx)}{2}\right] dx\,dt =$$

$$\frac{K\omega E_0^2}{4\pi b}\left\{\int_0^{\frac{2\pi}{\omega}} \Big|X\Big|_a^{a+b} dt - \frac{1}{2k}\int_0^{\frac{2\pi}{\omega}} \sin[2\omega t + 2k(a+b)]dt +\right.$$

$$\left.\frac{1}{2k}\int_0^{\frac{2\pi}{\omega}} \sin(2\omega t + 2ka)dt\right\} \tag{9}$$

Continuing $$F_1 = \frac{K\omega E_0^2}{4\pi b}\left\{\Big|1 bt\Big|_0^{\frac{2\pi}{\omega}} + \Big|\frac{1}{4k\omega}\cos[2\omega t + 2k(a+b)]\Big|_0^{\frac{2\pi}{\omega}} -\right.$$

$$\left.\Big|\frac{1}{4k\omega}\cos(2\omega t + 2ka)\Big|_0^{\frac{2\pi}{\omega}}\right\} \tag{10}$$

or $$F_1 = \frac{K\omega E_0^2}{4\pi b}\left\{\frac{2\pi b}{\omega} + \frac{\cos[2k(a+b)]}{4k\omega} - \frac{\cos[2k(a+b)]}{4k\omega} -\right.$$

$$\left.\frac{\cos 2ka}{4k\omega} + \frac{\cos 2ka}{4k\omega}\right\} \tag{11}$$

From which $$F_1 = \frac{K\omega E_0^2}{4\pi b} \cdot \frac{2\pi b}{\omega} = \frac{KE_0^2}{2} \text{ per unit length along } X \quad (12)$$

Since the frequency $\omega/2\pi$ and the conductive diaphragm dimensions $a$ and $b$ on a wavelength scale do not appear in Formula 12, the conclusion may be drawn that $F_1$ is independent of the microwave frequency.

If as is usually the case in guided plane wave propagation $$E = E_0 \sin \frac{\pi y}{a}$$

where $a$ is the width of the guiding plane and $a$ is ordinarily equal to or greater than $\lambda/2$ where $\lambda$ is the operating wavelength, the average force in the $y$ direction is $$F_y = \int_0^a \frac{E_0^2}{a} \sin^2 \frac{\pi y}{a} dy = \frac{E_0^2}{2a} \int_0^a \left(1 - \cos \frac{2\pi y}{a}\right) dy =$$

$$\frac{E_0^2}{2a} \left\{ \left|y\right|_0^a - \left|\frac{a}{2\pi}\right| \sin \frac{2\pi y}{a}\Big|_0^a \right\} = \frac{E_0^2}{2} \quad (13)$$

Therefore, the force per unit area where $E$ is a function of all four variables ($X$, $Y$, $Z$, $t$) in guided wave propagation is $$F_0 = \frac{KE_0^2}{4} \quad (14)$$

As stated heretofore the forces due to the electric fields of the propagated microwaves are always attracting. A similar calculation for the forces exerted between the waveguide walls due to the currents flowing in said walls indicates that such forces due to the magnetic field are approximately one-sixth as great as the force due to the electric field. Since the sign of the forces due to the magnetic field are opposite in sign to those due to the electric field, the resultant force exerted between the opposite waveguide walls is about five-sixths of the force due to the electric field alone.

Formula 14 shows that the force $F_0$ for a constant field $E_0$ is independent of the microwave frequency. However, the field $E_0$ is not independent of frequency. In order to make the electric field $E_0$ independent of frequency and therefore to make $F_0$ completely independent of frequency, the conductive diaphragm may be employed to form a portion of the outer conductor of a concentric transmission line which is substituted for the waveguide system described heretofore. Such a concentric transmission line should be proportioned so that the inner diameter of the outer conductor of the line is very small as compared to a wavelength of the transmitted microwave energy.

Referring to Figures 3 and 4, microwave generator 9 is coupled to a waveguide 7, preferably of rectangular cross-section, which includes a circular flexible conductive diaphragm 11 which fills an aperture in the top wide wall 5 of the waveguide. The flexible conductive diaphragm 11 may comprise, for example, a fine mesh screen having of the order of 1000 conductors per linear inch and having a thickness of the order of .2 to 1.0 mil. Such a fine mesh screen may be constructed by photodeposition, or by other known means, and it may be supported by means of a bezel 13 which accurately fits into the circular opening in the top waveguide wall 5. A typical method of making such a screen is disclosed in the copending U. S. application of Harold B. Law, Serial No. 531,008, filed April 14, 1944, now abandoned. As explained heretofore, variations in the microwave fields due to wave propagation through the waveguide 7 provide mechanical displacement or deformation of the flexible diaphragm in response to modulation or interruption of the microwaves.

A short coupling stub 15 is secured to the center of the diaphragm, and is linked to a low inertia lever mechanism 17 which is pivoted at a point 19 to a bracket 21 mounted upon the side wall of the waveguide 7. A source of light 23, focused to a fine beam by means of a lens system 25, is interrupted by the end of the lever mechanism 17 remote from the flexible diaphragm 11 whereby vertical motion of the end of said lever in response to displacement or deformation of the diaphragm interrupts the focused light beam as a function of the microwave modulation or interruption. The interrupted light beam is focused by a second lens system 27 upon a photoelectric cell or other light sensitive device 29. The light-sensitive device is connected through a suitable high gain amplifier 31 to a meter or other indicating device 33, which provides an indication of the magnitude of the interrupted microwaves propagated along the waveguide. It should be understood that any known type of light interferometer may be substituted for the photoelectric cell and indicator for indicating very small displacements of the diaphragm and its lever.

In order that the microwaves may be interrupted at a rate to which the flexible diaphragm 11 is resonant, so that its displacement efficiency will be high, the output of the amplifier 31 may be coupled, for example, through a limiter circuit 35 and a rectifier 37 to provide control pulses which are substantially independent of the magnitude of the pulsed microwaves for controlling the pulsing rate of a pulse generator 39 of any conventional type. The pulses derived from the pulse generator 39 may be applied to a modulator circuit 41 which modulates or keys the microwave generator 9 at the rate to which the flexible diaphragm 11 is resonant.

For relatively small displacements of the flexible diaphragm 11, the photoelectric cell 29 is exposed to the light beam focused thereon to an extent which is substantially directly proportional to the diaphragm displacement, and which therefore is proportional to the square of the voltage $E_0$ between the diaphragm and the opposite waveguide wall. Thus, the deflection also is proportional to the transmitted power providing the waveguide is properly matched. The keying rate of the microwaves derived from the generator 9 will be controlled by the natural period of the flexible diaphragm 11 and its lever mechanism, while the keying amplitude will be substantially uniform due to the action of the limiter circuit 35 whereby the microwaves may be effectively completely pulsed on and off.

The device of Figure 5 is similar in all respects to the device of Figures 3 and 4 with the exception that the lever mechanism for interrupting the light beam has been modified to include only a substantially rigid coupling, indicated by the dash line 43, from the center of the flexible diaphragm 11 to a small mirror 45 which cooperates with a fixed light-aperture device 47 for interrupting the light beam from the source 23 to the photoelectric cell 29. Thus deformation or displacement of the center portion of the flexible diaphragm 11 provides corresponding displacement or tilting of the mirror 45 which deflects the light beam with respect to the light-aperture 47, thus controlling the amount of light which reaches the photoelectric cell 29. Otherwise the device of Figure 5 is identical to and operates in a similar manner to that of the device of Figures 3 and 4.

The device illustrated in Figures 6 and 7 is similar in all respects to the devices illustrated and described heretofore with the exception that a relatively thickened center portion 10 of the flexible diaphragm 11 has no external mechanical linkage or lever mechanism for interrupting the light beam. Light from the source 23 is focused by the first lens system 25 through apertures 49 and 51 in the waveguide walls adjacent to the edges of the flexible diaphragm 11 in a manner whereby the center portion 10 of the diaphragm itself normally completely interrupts the light beam. However, mechanical displacement or deformation of the center of the diaphragm permits light to pass through the aperture 51 in the side wall of the waveguide and thus to be focused by the second lens system 27 upon the photoelectric cell 29. Otherwise the operation and construction of the system is identical to that of the other devices described heretofore.

Figures 8 and 9 illustrate another modification of the devices described heretofore wherein the flexible conductive diaphragm 11 includes only a short, centrally located stub 53 connected normally to the center of the diaphragm. The stub 53 interrupts light from the source 23 which is focused by the lens systems 25 and 27 upon the photoelectric cell 29. The operation of the device is similar in all respects to that of the device illustrated in Figures 3 and 4 with the exception that the mechanical advantage of the lever system 17, 19 is not obtained. However, due to its mechanical stability and rigidity, it may be a desirable modification for some applications of the invention. Otherwise the system comprises identical components with, and operates substantially the same as, the other modifications of the invention described heretofore.

Figure 10 shows a modification of the device illustrated in Figures 8 and 9 which employs a coaxial transmission line in place of the waveguide 7 previously described. As explained heretofore the coaxial line embodiment of the invention has the advantage that it is substantially independent of the microwave frequency, providing that the inner radius of the outer conductor 55 of the concentric line is a small fraction of one wavelength of the microwave energy. The coaxial line includes a central conductor 57. A relatively small portion of a short section of the outer conductor 55 is removed, and a flexible conductive diaphragm 59 is supported therein by means of a bezel 61 as described heretofore. A short straight stub 63 is connected to the center of the flexible diaphragm 59, and the end of the stub 63 remote from the diaphragm is utilized to interrupt the light beam 65 in the same manner as described heretofore. The light focusing means and the electrical circuits may be identical with those described heretofore for the waveguide embodiments of the invention.

Thus the invention disclosed comprises several embodiments and modifications of wave energy measuring systems employing light translating means responsive to the mechanical displacement of a flexible conductive diaphragm subjected to a pulsed microwave field in a guided wave transmission system, whereby displacement of the diaphragm actuates electrical circuits which indicate the magnitude of the guided waves.

I claim as my invention:

1. The method of detecting microwave energy comprising the steps of utilizing said microwave energy to establish a microwave field having an electric field component, converting said electric field energy to kinetic energy, utilizing said kinetic energy to control light energy, detecting said controlled light energy, and converting said detected controlled light energy to electrical energy characteristic of the magnitude of said microwave energy.

2. The method of utilizing a light source and a movable element for detecting microwave energy in a microwave field having an electric field component comprising the steps of subjecting said elements substantially only to the electric field component of said microwave energy for mechanically displacing said element as a function of the magnitude of said electric field, interrupting light from said source in response to said mechanical displacement of said element, detecting said interrupted light, and converting said detected interrupted light to electrical energy characteristic of the magnitude of said microwave energy.

3. Apparatus for detecting microwave energy including a movable element subjected substantially only to the electric field component of said microwave energy in a manner whereby said element is mechanically displaced as a function of the magnitude of said electric field, a light source, means responsive to said displacement of said element for interrupting light from said source, and a light-sensitive device responsive to said interrupted light for deriving electrical energy characteristic of the magnitude of said microwave energy.

4. Apparatus for detecting microwave energy in a waveguide transmission system including a diaphragm forming a portion of the transverse wall of said waveguide and subjected substantially only to the microwave electric field therein in a manner whereby said diaphragm is displaced as a function of the magnitude of said electric field, a light source, and a light-sensitive electrical device responsive to said light source in a manner whereby displacement of said diaphragm provides interruption of the irradiation of said light-sensitive device.

5. Apparatus for detecting microwave energy in a waveguide transmission system including a diaphragm forming a portion of said waveguide and subjected substantially only to the microwave electric field therein in a manner whereby said diaphragm is displaced as a function of the magnitude of said electric field, a light source, a light sensitive electrical device responsive to said light source, and means responsive to displacement of said diaphragm for interrupting the irradiation of said light sensitive device.

6. Apparatus for detecting microwave energy in a waveguide transmission system including a diaphragm forming a portion of the transverse wall of said waveguide and subjected substantially only to the microwave electric field therein in a manner whereby said diaphragm is distorted as a function of the magnitude of said electric field, a light source, a light sensitive electrical device responsive to said light source, means for directing said light on said diaphragm whereby said distortion of said diaphragm interrupts the irradiation of said light sensitive device, and means for deriving electric energy from said light sensitive device characteristic of the magnitude of said microwave energy.

7. Apparatus for detecting microwave energy in a waveguide transmission system including a diaphragm forming a portion of the transverse wall of said waveguide and subjected substantially only to the microwave electric field therein in a manner whereby said diaphragm is distorted as a function of the magnitude of said electric field, a light source, a light sensitive electrical device responsive to said light source, means for directing said light edgewise at and across said diaphragm whereby said distortion of said diaphragm interrupts the irradiation of said light sensitive device, and means for deriving electric energy from said light sensitive device characteristic of the magnitude of said microwave energy.

8. Apparatus for detecting microwave energy in a waveguide transmission system including a diaphragm forming a portion of the transverse wall of said waveguide and subjected substantially only to the microwave electric field therein in a manner whereby said diaphragm is displaced as a function of the magnitude of said electric field, a light source, a light sensitive electrical device responsive to said light source, a light shutter disposed adjacent said diaphragm and responsive to displacement of said diaphragm for interrupting the irradiation of said light sensitive device, and means for deriving electric energy from said light sensitive device characteristic of the magnitude of said microwave energy.

9. Apparatus for detecting microwave energy in a waveguide transmission system including a diaphragm forming a portion of the transverse wall of said waveguide and subjected substantially only to the microwave electric field therein in a manner whereby said diaphragm is displaced as a function of the magnitude of said electric field, a light source, a light sensitive electrical device responsive to said light source, a mirror disposed adjacent said diaphragm in the path of said light between said light source and said light sensitive device and responsive to displacement of said diaphragm for interrupting the irradiation of said light sensitive device, and means for deriving electric energy from said light sensitive device characteristic of the magnitude of said microwave energy.

LOWELL E. NORTON.

REFERENCES CITED

The following references are of record in the file of this patent:

FOREIGN PATENTS

| Number | Country | Date |
|---|---|---|
| 548,681 | Great Britain | Oct. 20, 1942 |